Patented May 23, 1944

2,349,313

UNITED STATES PATENT OFFICE 2,349,313

DERIVATIVES OF 2,4-OXAZOLIDINEDIONE

Roger W. Stoughton, St. Louis, Mo., assignor to Mallinckrodt Chemical Works, St. Louis, Mo., a corporation of Missouri No Drawing. Application March 1, 1943,
Serial No. 477,631

6 Claims. (Cl. 260—307)

This invention relates to new derivatives of 2,4-oxazolidinedione, and with regard to certain more specific features to such derivatives which represent substitutions in the 5-position by two alkyl radicals at least one of which contains at least three carbon atoms.

This application is a continuation-in-part of my copending application Serial No. 318,321, filed February 10, 1940.

Among the several objects of this invention may be noted the provision of new chemical compounds which are 5,5-disubstituted derivatives of 2,4-oxazolidinedione; the provision of alkali and alkaline earth metal salts of said compounds; the provision of 5,5-disubstituted 2,4-oxazolidinediones which are short acting anaesthetics; the provision of 5,5-disubstituted 2,4-oxazolidinediones which are useful as therapeutics and 5,5-disubstituted 2,4-oxazolidinediones which have a substantial range between the therapeutic and the lethal doses. Other objects will be in part obvious and in part pointed out hereinafter.

The invention accordingly comprises the elements and combinations of elements, the proportions thereof, and features of composition, which will be exemplified in the substances and products hereinafter described, and the scope of the application of which will be indicated in the following claims.

The compounds included in this invention may be represented by the following type formula:

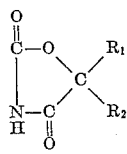

in which $R_1$ and $R_2$ are unsubstituted saturated alkyl or cycloalkyl hydrocarbon radicals, $R_1$ plus $R_2$ containing not less than six and not more than ten carbon atoms. Where $R_1$ and $R_2$ are different radicals the sum of the carbon atoms should not exceed nine.

The following examples illustrate the invention:

Example 1

Typical of the compounds included in the present invention is the di-n-propyl derivative of 2,4-oxazolidinedione. This compound may be represented by the following structural formula:

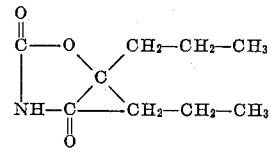

and may be prepared in the following manner:

A mixture of 39 g. (0.2 mol) of ethyl α,α-di-n-propyl-α-hydroxyacetate (prepared, for example, by the hydrolysis and subsequent esterification of the cyanohydrin of di-n-propyl ketone or as described in Example 19, post) with 15 g. (0.25 mol) of dry urea is dissolved in 100 ml. of a 2.5 normal solution of sodium ethylate in absolute alcohol. The mixture is heated under a reflux for from ten to twelve hours, after which the alcohol is distilled off under reduced pressure and the residue dissolved in a minimum amount of cold water. The unreacted ester is then extracted with ether, the extracted aqueous solution is then acidified and an oil separates out. This oil is purified by distillation under reduced pressure, and is recrystallized from petroleum ether. The product, 5,5-di-n-propyl-2,4-oxazolidinedione, is obtained as a colorless, crystalline solid, which melts at 42 to 43° C. and boils at 148 to 150° C. under a pressure of 3 mm. of mercury. The yield is 75 to 80% of the theoretical.

5,5-di-n-propyl-2,4-oxazolidinedione is almost insoluble in cold water. It is very slightly soluble in cold petroleum ether, very soluble in warm petroleum ether, easily soluble in alcohol, ether, chloroform and benzene. It behaves as a weak mono-basic acid, and forms alkali and alkaline earth metal salts by reaction with the equivalent amount of alkali or alkaline earth metal hydroxide or carbonate. The sodium salt so obtained is a hygroscopic, glassy solid. It is very soluble in water and alcohol. The calcium salt is a crystalline, non-hygroscopic solid fairly soluble in water and alcohol. It crystallizes from aqueous solution as the mono-hydrate and decomposes without melting between 300 and 400° C.

Example 2

5,5-di-n-amyl-2,4-oxazoledione- To a solution of 1.2 g. of sodium in 25 cc. of absolute alcohol were added 3.3 g. of dry urea and 13 g. of ethyl α-n-amyl-α-hydroxyenanthate. This mixture was refluxed on a steam bath for twenty-one hours. As much alcohol as possible was removed under reduced pressure until foaming prevented further distillation. The gummy residue was cooled and dissolved in 100 ml. of ice water. This solution was extracted twice with 25 ml. portions of ether and acidified in the cold with hydrochloric acid. The oxazolidinedione precipitated as a colorless solid. It was finally recrystallized from petroleum ether. The melting point was found to be 63–64°. A yield of 10 g. (80%) was obtained.

Example 3

5-methyl-5-n-butyl - 2,4 - oxazolidinedione is prepared by substituting for the ester in Example 1, ethyl α-n-butyl-α methyl-α-hydroxyacetate. The product so obtained is a colorless oil boiling between 148 and 151° C., under 3.5 mm. pressure. It is slightly soluble in water, and easily soluble in alcohol, ether, benzene and petroleum ether.

Example 4

5-methyl-5-n-amyl-2,4-oxazolidinedione is obtained by substituting for the ester in Example 1, ethyl α-n-amyl-α-methyl-α-hydroxyacetate. The product is obtained as a waxy solid, melting at 25° C. to a colorless oil, which boils at 158 to 160° C. under 4 mm. pressure. It is very slightly soluble in water and easily soluble in alcohol, ether, benzene and petroleum ether.

Example 5

5-methyl-5-n-hexyl-2,4-oxazolidinedione is obtained by substituting for the ester in Example 1, ethyl α-n-hexyl-α-methyl-α-hydroxyacetate. The product obtained crystallizes as a colorless solid from petroleum ether, has a melting point of 46 to 47° C. and boils at from 161 to 163° C. under 5 mm. pressure. It is insoluble in cold water, and cold petroleum ether, but is easily soluble in alcohol, ether, benzene and warm petroleum ether.

Example 6

5-methyl-5-n-heptyl-2,4-oxazolidinedione is obtained by substituting for the ester in Example 1, ethyl α-n-heptyl-α-methyl-α-hydroxyacetate. The product crystallizes from petroleum ether in the form of fine colorless needles, which melt at 32° C. and boil at 154 to 158° C. under 2 mm. pressure. They are insoluble in water and cold petroleum ether, but are soluble in alcohol, ether, benzene and warm petroleum ether.

Example 7

5-methyl-5-isoamyl-2,4-oxazolidinedione is obtained by substituting for the ester in Example 1, ethyl α-ethyl-α-isoamyl-α-hydroxyacetate. The product is obtained as a colorless oil boiling from 150 to 153° C. under 2.5 mm. pressure. It is insoluble in water, but easily soluble in alcohol, ether, benzene and petroleum ether.

Example 8

5-ethyl-5-cyclohexyl-2,4-oxazolidinedione is obtained by substituting for the ester in Example 1, ethyl α-cyclohexyl-α-ethyl-α-hydroxyacetate. The product crystallizes from dilute methanol as iridescent plates which melt at 100 to 101° C. It is insoluble in water and petroleum ether, but soluble in alcohol, ether and benzene.

Example 9

5,5-di-isopropyl-2,4-oxazoledinedione is obtained by substituting for the ester in Example 1, ethyl α,α-di-isopropyl-α-hydroxyacetate. The product crystallizes as colorless needles from a mixture of benzene and petroleum ether, has a melting point of 86 to 87° C. and boils at 138 to 139° C. under 2.5 mm. pressure. The needles are insoluble in cold water and petroleum ether, but are soluble in alcohol, ether and benzene.

Example 10

5,5-di-n-butyl-2,4-oxazolidinedione is prepared by substituting for the ester in Example 1, ethyl α,α-di-n-butyl-α-hydroxyacetate. The product crystallizes as fine colorless needles from petroleum ether. These needles melt at 68 to 69° C., boil at 165 to 175° C. at 5 mm. pressure, and are insoluble in water and cold petroleum ether but are soluble in alcohol, ether, benzene and warm petroleum ether.

As has been indicated above, the ester which is condensed with urea to prepare the oxazolidinedione compounds described above may be conveniently obtained by the hydrolysis and subsequent esterification of the cyanohydrin of the corresponding dialkylketone. In some instances, however, it may be more convenient to obtain the material for the urea condensation in other manners.

Example 11

Ethyl α-n-butyl-α-methyl-α-hydroxyacetate was prepared as follows: In a one-liter three-necked flask, fitted with a mechanical stirrer and dropping funnel, are placed a solution of 26 g. (0.5 mol) of sodium cyanide (technical cyan-egg) in 75 ml. of water, and 50 g. (0.5 mol) of n-butyl methyl ketone. The flask was cooled in an ice bath, stirred vigorously and 130 ml. of a saturated solution of sodium bisulfite was added to the mixture over a period of one and a half hours. Stirring was continued for a half hour after the addition of the bisulfite had been completed. The cyanohydrin layer was separated and dissolved in 200 ml. of absolute alcohol, to which 5 ml. of water had been added. This mixture was saturated with dry gaseous hydrogen chloride, and refluxed for twenty hours. From time to time the ammonium chloride which separated was filtered off, to prevent lumping. The excess alcohol was then removed by distillation from the steam bath, and the residue poured onto cracked ice. The resulting oil was taken up in ether, washed with a sodium carbonate solution, and distilled. A small amount of free acid was recovered from the carbonate washings. The ethyl ester so obtained had a boiling point of 100 to 101° C. under 25 mm. pressure. The corresponding acid, namely, α-n-butyl-α-methyl-α-hydroxyacetic acid, obtained by hydrolyzing the ester, had a melting point of 33° C. and a boiling point under 5 mm. pressure of 127 to 129° C.

The ester product so obtained may then be converted by the procedure outlined above to 5-methyl-5-n-butyl-2,4-oxazolidinedione, by reaction with urea.

Example 12

Ethyl α - n - amyl-α-methyl-α-hydroxyacetate was prepared by substituting methyl n-amyl ketone for the methyl n-butyl ketone in Example 11. The ester so obtained boils between 112 and 113° C. under 23 mm. pressure. The corresponding acid has a melting point of 44 to 45° C. and a boiling point of 139 to 140° C. under 6 mm. pressure. The ester product may be converted into 5-methyl-5-n-amyl-2,4-oxazolidinedione by the method outlined above.

*Example 13*

Ethyl α-n-hexyl-α-methyl-α-hydroxyacetate is prepared by substituting methyl n-hexyl ketone for the methyl n-butyl ketone in Example 11. The ethyl ester so obtained has a boiling point of from 131 to 133° C. under 35 mm. pressure. The corresponding acid has a melting point of 40–41° C. and the p-toluidide of the acid has a melting point of 98 to 99° C. The ester product may be converted to 5-methyl-5-n-hexyl-2,4-oxazolidinedione by the previously-described method.

*Example 14*

Ethyl α-n-heptyl-α-methyl-α-hydroxyacetate is prepared by substituting methyl n-heptyl ketone for the methyl n-butyl ketone in Example 11. The ethyl ester so obtained has a boiling point of 103 to 104° C. under 3 mm. pressure and of 138 to 140° C. under 20 mm. pressure. The corresponding acid has a melting point of 38 to 39° C. and a boiling point of 140 to 142° C. under 2 mm. pressure. The ester may be converted into 5-methyl-5-n-heptyl-2,4-oxazolidinedione by reaction with urea.

*Example 15*

Ethyl α-ethyl-α-isoamyl-α-hydroxyacetate is prepared as follows: Into a three-liter, three-necked flask fitted with a mechanical stirrer, reflux condenser and dropping funnel, were placed 9.2 g. of magnesium turnings, 5 ml. of ethyl bromide and 25 ml. of anhydrous ether. A crystal of iodine was added, and after the reaction had started, 250 ml. of ether were added. A mixture of 43 g. of ethyl-α-keto-δ-methylcaproate (prepared as described in the following example) and 38 g. of ethyl bromide was then added dropwise through the separatory funnel, at such a rate as to cause the ether to reflux gently. This required about six hours. The flask was then heated by means of a water bath for one hour, and then allowed to stand over night at room temperature. The next morning the reaction mixture was cooled and decomposed by the slow addition of 150 ml. of 6N sulfuric acid, and an equal volume of water. The ethereal layer was separated, washed with sodium carbonate solution, and distilled. The fraction boiling at 105 to 120° C. under 20 mm. pressure was collected. This crude product was stirred with 100 ml. of a saturated sodium bisulfite solution, and allowed to stand for twenty-four hours. At the end of this time, the sodium bisulfite addition product of the unchanged keto ester was removed by filtration, and the hydroxy acid ester taken up in benzene. This was further purified by careful rectification through an efficient fractionating column. This method of purification leaves a little keto acid present, but it can be removed by hydrolyzing the ester, and recrystallizing the acid from petroleum ether or dilute methanol, if desired. The acid melts at 69 to 70° C. and boils without decomposition at 121 to 125° C. under a pressure of 3 mm. The pure ester boils at 114 to 115° C. under a pressure of 20 mm. The ester product so obtained may be reacted with urea to form 5-ethyl-5-isoamyl-2,4-oxazolidinedione.

*Example 16*

Ethyl α-keto-δ-methylcaproate is prepared as follows: In a three-liter, three-necked flask fitted with a mechanical stirrer, reflux condenser and dropping funnel, were placed 146 g. (1 mol) of ethyl oxalate dissolved in 500 ml. of anhydrous ether. The flask was cooled in an ice-salt bath, the stirrer started, and one molecular equivalent of isoamyl magnesium bromide prepared from 27 g. of magnesium and 151 g. of isoamyl bromide in 400 ml. of dry ether was added over a period of five hours. During this time the temperature was maintained between —5° and —10° C. After the addition of the Grignard reagent was completed, the mixture was stirred for two hours longer and allowed to stand over night at room temperature. The flask was again cooled and the reaction mixture decomposed by slowly adding 300 ml. of 6N sulfuric acid, with vigorous stirring. The ether layer was separated, washed with a sodium carbonate solution, and distilled through an efficient fractionating column. The boiling point of the ester was 109 to 110° C. under 20 mm. pressure. The corresponding semicarbazone had a melting point of 160 to 161° C.

*Example 17*

Ethyl α-ethyl-α-cyclohexyl-α-hydroxyacetate is prepared from ethyl magnesium bromide and ethyl cyclohexylglyoxalate, using the procedure described for the preparation of ethyl α-ethyl-α-isoamyl-α-hydroxyacetate described above. The boiling point of the ester so obtained is 129 to 130° C. under 20 mm. pressure. The corresponding acid has a melting point of 136 to 137° C. The ester may be converted into 5-ethyl-5-cyclohexyl-2,4-oxazolidinedione by reaction with urea.

*Example 18*

Ethyl cyclohexylglyoxalate is prepared from cyclohexyl magnesium bromide and ethyl oxalate, by using the procedure described for the preparation of ethyl-α-keto-δ-methylcaproate. The ester obtained has a boiling point of 132 to 134° C. under 20 mm. pressure. The semicarbazone has a melting point of 153 to 154° C.

*Example 19*

Ethyl α,α-di-n-propyl-α-hydroxyacetate may be prepared as follows: Into a three-liter, three-necked flask, fitted with a mechanical stirrer, reflux condenser, and dropping funnel, were placed 35 g. of magnesium turnings, 10 ml. of n-propyl bromide and 10 ml. of anhydrous ether. A crystal of iodine was added and after the reaction had started, 500 ml. of ether were added. A mixture of 190 g. of n-propyl bromide and 95 g. of ethyl oxalate was then added dropwise through the funnel, at such a rate as to cause the ether to reflux gently by the heat of the reaction. This required four hours. The flask was heated by means of a water bath, for one hour and allowed to stand over night at room temperature. The next morning the reaction mixture was cooled and decomposed, by the slow addition of 250 ml. of 6N sulfuric acid, followed by an equal volume of water. The ethereal layer was separated, washed with sodium carbonate solution, and purified by careful rectification through an efficient fractionating column. The ester product so obtained had a boiling point of 113 to 114° C. under 30 mm. pressure. The free acid which corresponds, namely the α,α-di-n-propyl-α-hydroxyacetic acid, melts at 80 to 81° C. The ester obtained in this way may be converted as described in Example 1, to 5,5-di-n-propyl-2,4-oxazolidinedione, through reaction with urea.

*Example 20*

Ethyl α,α-di-isopropyl-α-hydroxyacetate is prepared from isopropyl magnesium bromide and ethyl oxalate by the same method used in Example 19 to prepare the n-propyl derivative. The ester obtained has a boiling point of 71 to 73° C. under 5 mm. pressure. The corresponding free acid melts at 114 to 115° C. The ester product may, if desired, be converted into 5,5-di-isopropyl-2,4-oxazolidinedione, as outlined above.

*Example 21*

Ethyl α,α-di-n-butyl-α-hydroxyacetate is prepared in a similar manner, by substituting n-butyl magnesium bromide for the n-propyl magnesium bromide in Example 19. The ethyl ester so obtained has a boiling point of 116 to 117° C. under 11 mm. pressure. The corresponding free acid melts at 87 to 88° C. The ester so obtained may then be reacted with urea to form 5,5-di-n-butyl-2,4-oxazolidinedione.

*Example 22*

α-n-Amyl-α-hydroxyenanthoic acid. In a 200 ml. round bottom flask, cooled in an ice-salt bath and protected by a spiral condenser cooled in ice water, were placed 7 g. of liquid hydrogen cyanide. The hydrogen cyanide was prepared according to the method described in Organic Syntheses and was condensed directly into the flask. Twenty-five grams of di-n-amyl ketone, to which had been added 0.5 ml. of piperidine, were then added over a period of ten minutes. The mixture was shaken occasionally and allowed to stand one hour at 0° C. After the condenser had been replaced by a mechanical stirrer and the flask cooled in an ice-salt bath, 40 ml. of cold concentrated sulfuric acid which had been previously diluted with 4 ml. of water was added over a period of ten minutes with vigorous stirring. The mixture became homogeneous as soon as the addition was complete and the stirring was stopped. The bath was maintained at 0° C. for five hours and then the reaction mixture was allowed to stand over night at room temperature. The next morning it was poured onto cracked ice. The crude amide was hydrolyzed by refluxing with 300 ml. of hydrochloric acid for 17 hours. It was finally recrystallized from petroleum ether. It melted at 76–77° C. The yield amounted to 19 g. The acid was esterified in the usual manner by refluxing with absolute ethyl alcohol saturated with dry hydrogen chloride. It boiled at 128–129° C. at 5 mm. pressure.

*Example 23*

5-methyl-5-(3-methylhexyl)-2,4-oxazolidinedione is prepared by substituting for the ester in Example 1, ethyl α-methyl-α-(3-methylhexyl)-α-hydroxyacetate. The product so obtained is a colorless oil, boiling between 168–169° C., under 3 mm. pressure. It is almost insoluble in water, but readily soluble in alcohol, ether and benzene.

*Example 24*

5,5-diisobutyl-2,4-oxazolidinedione is prepared by substituting for the ester in Example 1, ethyl α,α-diisobutyl-α-hydroxyacetate. The product so obtained is a colorless oil boiling between 150 and 151° C., under 3 mm. pressure. It is very soluble in all common organic solvents including petroleum ether but insoluble in water.

*Example 25*

Ethyl α-methyl-α-(3-methylhexyl)-α-hydroxyacetate was prepared by substituting 5-methyloctanone-2 for the methyl n-butyl ketone in Example 11. The ester so obtained boiled between 112 and 114° C., at 9 mm. pressure. The corresponding acid had a melting point of 47 to 48° C. The ester product may be converted into 5-methyl-5-(3-methylhexyl)-2,4-oxazolidinedione by the method outlined above.

*Example 26*

Ethyl α,α-diisobutyl-α-hydroxyacetate was prepared by substituting diisobutyl ketone for the methyl n-butyl ketone in Example 11. The ester so obtained boiled between 105 and 106° C., at 5 mm. pressure. The corresponding acid had a melting point of 128–129° C. The ester product may be converted into 5,5-diisobutyl-2,4-oxazolidinedione by the method outlined above.

All of the oxazolidinedione compounds described above behave as mono-basic acids, and form salts with alkali and alkaline earth metal hydroxides or carbonates. These salts may be conveniently prepared merely by reacting an equivalent of the alkaline or alkali earth metal hydroxide or carbonate with the oxazolidinedione.

5,5-disubstituted 2,4-oxazolidinedione compounds prepared in accordance with the present invention have valuable therapeutic properties as relatively short acting anaesthetics. It has been found that the efficient dose for their anaesthetic effect is substantially below a lethally toxic dose. Except for the 5,5-di-n-propyl compound these compounds apparently do not have hypnotic, sedative, or analgesic properties at dose levels below the anaesthetic dose level. The di-n-propyl compound possesses hypnotic and sedative effects below the level required for complete aneasthesia and in addition causes a period of sedation following a period of anaesthesia which it induces. These products may be used in any of the forms usually employed. For example, their solutions may be administered orally, or by subcutaneous, intravenous or intramuscular injection.

Attention is directed to my co-pending applications, Serial No. 426,783 and Serial No. 426,784, both filed January 14, 1942.

In view of the above, it will be seen that the several objects of the invention are achieved and other advantageous results attained.

As many changes could be made in the above substances and products without departing from the scope of the invention, it is intended that all matter contained in the above description shall be interpreted as illustrative and not in a limiting sense.

I claim:

1. Compounds of the group consisting of those of the following formula:

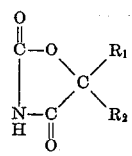

in which $R_1$ and $R_2$ are radicals taken from the group consisting of unsubstituted saturated alkyl and unsubstituted saturated cycloalkyl hydrocarbon radicals, R1 plus R2 containing not less than six and not more than ten carbon atoms, and salts thereof, said compounds and salts being prepared for use as therapeutics.

2. Compounds of the group consisting of those of the following formula:

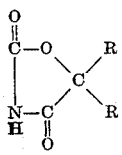

in which both R's are identical radicals taken from the group consisting of unsubstituted saturated alkyl and unsubstituted saturated cycloalkyl hydrocarbon radicals containing at least three and not more than five carbon atoms, and salts thereof, said compounds and salts being prepared for use as therapeutics.

3. Compounds of the group consisting of those of the following formula:

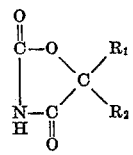

in which $R_1$ and $R_2$ are different radicals taken from the group consisting of unsubstituted saturated alkyl and unsubstituted saturated cycloalkyl hydrocarbon radicals, $R_1$ plus $R_2$ containing not less than six and not more than nine carbon atoms, and salts thereof, said compounds and salts being prepared for use as therapeutics.

4. The compound 5,5-di-n-amyl-2,4-oxazolidinedione prepared for use as a therapeutic.

5. The compound 5,5-di-n-butyl-2,4-oxazolidinedione prepared for use as a therapeutic.

6. The compound 5-methyl,5-(3-methylhexyl)-2,4-oxazolidinedione prepared for use as a therapeutic.

ROGER W. STOUGHTON.

CERTIFICATE OF CORRECTION.

Patent No. 2,349,313.                                              May 23, 1944.

ROGER W. STOUGHTON.

It is hereby certified that error appears in the printed specification of the above numbered patent requiring correction as follows: Page 1, second column, line 8, for that portion of the formula reading "$C\text{---}CH_2\text{-}CH_2$" read --$C\text{ -}CH_2\text{-}CH_2$--; and that the said Letters Patent should be read with this correction therein that the same may conform to the record of the case in the Patent Office.

Signed and sealed this 12th day of September, A. D. 1944.

Leslie Frazer (Seal)                                                   Acting Commissioner of Patents.